No. 706,432. Patented Aug. 5, 1902.
F. H. MASON.
SELF CLOSING VALVE.
(Application filed Dec. 18, 1900.)
(No Model.) 2 Sheets—Sheet 1.
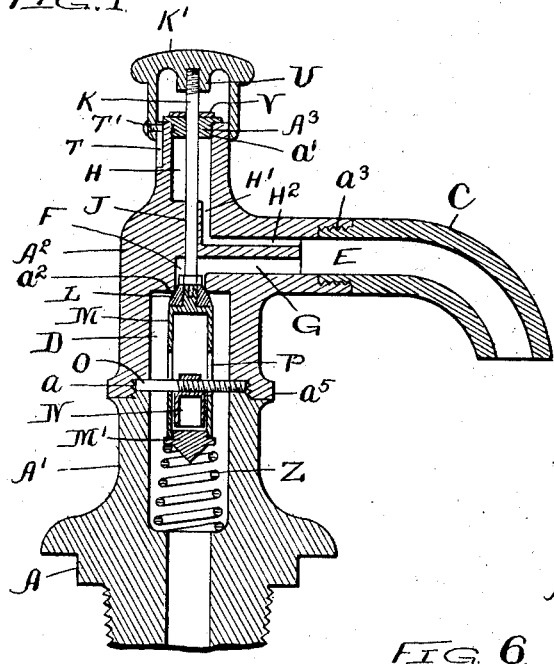
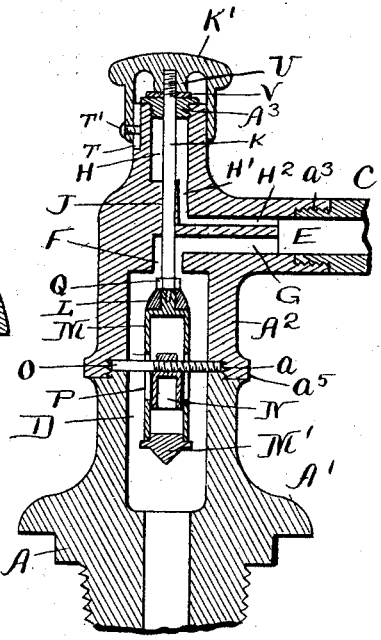
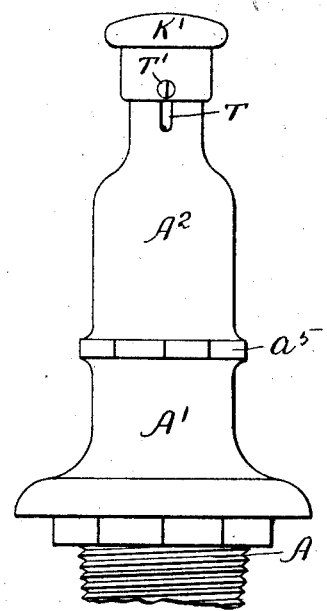
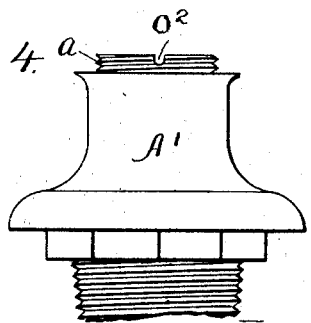
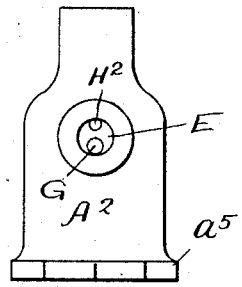
WITNESSES:
Lew. E. Curtis
H. W. Munday
INVENTOR:
FREDERIC H. MASON
By Munday, Evarts & Adcock
HIS ATTORNEYS.
THE NORRIS PETERS CO., PHOTO-LITHO., WASHINGTON, D. C.

No. 706,432. Patented Aug. 5, 1902.
F. H. MASON.
SELF CLOSING VALVE.
(Application filed Dec. 18, 1900.)
(No Model.) 2 Sheets—Sheet 2.
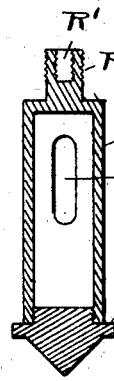
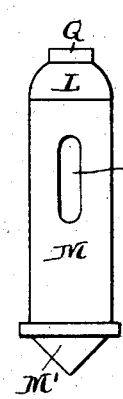
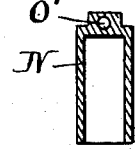
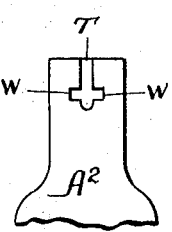
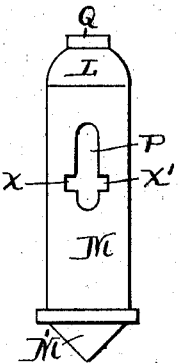
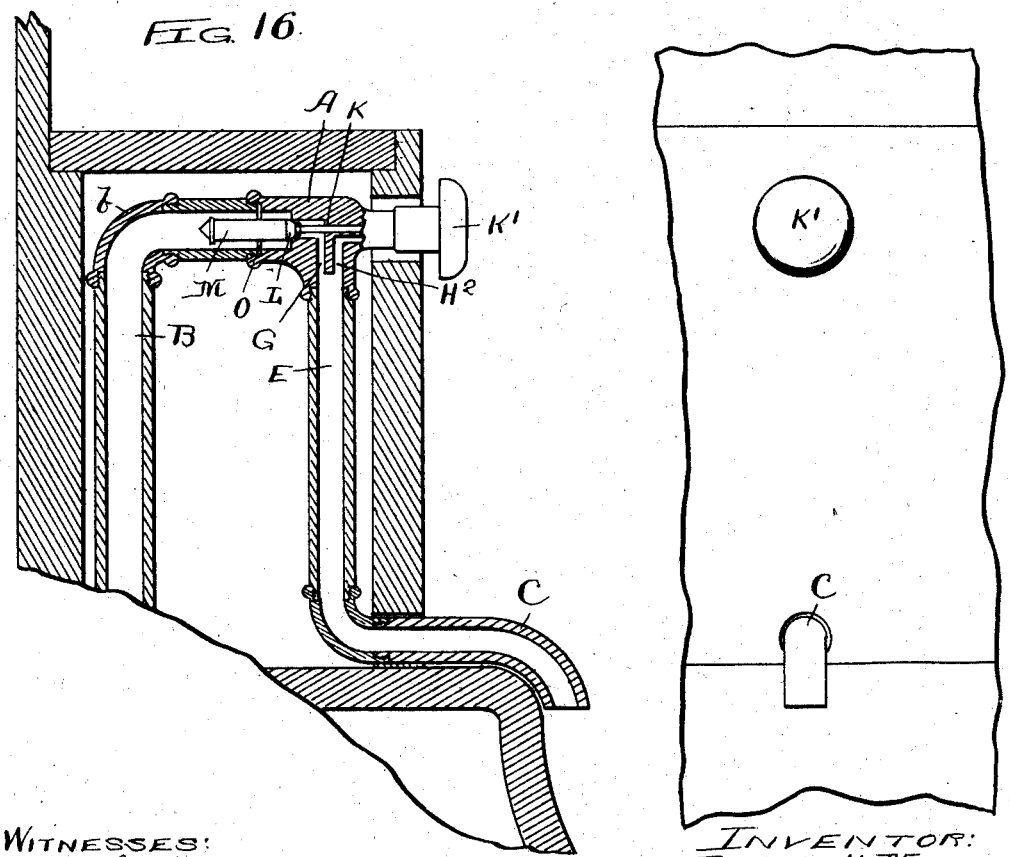
WITNESSES:
Lew. E. Curtis
H. W. Munday
INVENTOR:
FREDERIC H. MASON
BY Munday, Evarts & Adcock
HIS ATTORNEYS.

UNITED STATES PATENT OFFICE.

FREDERIC HAMILTON MASON, OF SPOKANE, WASHINGTON.

SELF-CLOSING VALVE.

SPECIFICATION forming part of Letters Patent No. 706,432, dated August 5, 1902.

Application filed December 18, 1900. Serial No. 40,240. (No model.)

*To all whom it may concern:*

Be it known that I, FREDERIC HAMILTON MASON, a citizen of the United States, residing in Spokane, in the county of Spokane and State of Washington, have invented a new and useful Improvement in Self-Closing Valves, of which the following is a specification.

My invention relates to valves which automatically close with and open against the pressure of water or other fluid to be delivered.

The object of my invention is to provide a self-closing valve simple, efficient, and durable, made entirely of metal without employing levers, stuffing-box, cams, gaskets, washers, or packing, which can be readily and easily opened against pressure of water or other fluid to be delivered and volume of discharge at same time easily increased or decreased at will of operator, and which will automatically close under the water or other fluid pressure smoothly and gradually without jarring, hammering, vibrating, or chattering, and which will also automatically open and drain when water or other fluid pressure is cut off and which cannot be tied or fastened open. These important objects or results I accomplish, and herein my invention consists by providing the valve and valve-shell with a fluid cushion or balance novel in construction, submerged in the confined fluid, and composed of two telescopic parts or members, one, preferably the inner or piston member, secured to the valve-shell, and the other, preferably the outer or cylinder member, attached to and moving in conjunction with the valve by which fluid is released or confined, and I have so devised this fluid-cushion that it balances the valve against sudden or quick movement, either with or against pressure of confined fluid, thereby enabling the valve to be opened gradually and smoothly against pressure of the confined fluid and to close smoothly and quietly by means of pressure of the confined fluid only without back pressure, water-hammer, chattering, or vibrating.

My invention also consists in the novel construction of parts and devices and in the novel combinations of parts and devices herein shown and described, and specified in the claims.

In the accompanying drawings, forming a part of this specification, I have for convenience illustrated and described my invention as applied to a vertical self-closing cock for delivery of hot or cold water; but it will be understood by those skilled in the art that my invention is adapted as well to horizontal basin cocks and bibs and for use in a great variety of appliances and for delivery of various fluids confined and to be delivered under pressure. In the drawings I have also illustrated my valve as applied to a horizontal basin-cock, so devised that it cannot be tied or fastened open.

In said drawings, Figure 1 represents a central vertical section of my invention as applied to a basin-cock and showing the valve closed. Fig. 2 represents the same with the valve open. Fig. 3 represents a back view of the same with the valve closed, showing the groove in the upper fitting or section of the valve-shell and set-screw in the cap. Fig. 4 is a side view of the lower section or fitting of the valve-shell, showing the recess to receive a cross-pin to hold stationary the inner cylinder, member, or piston of the fluid-cushion. Fig. 5 is a front view of the main section or fitting of the valve-shell looking toward the delivery-chamber and at right angles to the positions occupied in Figs. 1 and 2, showing the fluid escape-outlet and the drainage-outlet. Fig. 6 is a vertical central section of the screw top or plug for closing the drainage-chamber in the valve-shell. Fig. 7 is a top view of the same. Fig. 8 is a side view of the same. Fig. 9 is a central vertical section of the outside cylinder of the fluid-cushion, showing removable base or plug and extended, shouldered, and recessed end threaded outside for the nut-lock and threaded inside recess for the reception of the valve-rod. Fig. 10 is a side view of the same, showing one of the slots through which the cross-pin passes and having valve in place around the extended end and fastened on by a nut-lock. Fig. 11 is a central vertical section of the nut-lock. Fig. 12 is a central vertical section of the inner member, cylinder, or piston of fluid-cushion, showing extended end and threaded hole through which the cross-pin screws. Fig. 13 represents the cross-pin. Fig. 14 is a side view of one section or fitting of the valve-shell, showing the groove supplied with transverse notches to catch the set-screw by a slight turn of the cap. Fig. 15 represents the outer cylinder of the fluid-cushion, showing the slot supplied with similar notches to catch the cross-pin when the valve is slightly turned. Fig. 16 represents a central vertical section of my invention as applied to a horizontal basin-cock, and Fig. 17 is a front view of the same.

In the drawings similar letters of reference indicate like parts throughout the several figures.

In said drawings, A represents the valve-shell, the same being preferably made or composed of two or more separate sections, fittings, or parts $A'$ $A^2$ $A^3$, removably united together by screw-threads $a$ $a'$. The lower section or fitting $A'$ attaches to and connects with the supply-pipe B through the coupling $b$. The main or intermediate section or fitting $A^2$ has the valve-seat $a^2$, and to it the delivery-spout C is removably attached by screw-threads $a^3$. The top or plug section $A^3$ closes the drainage-chamber at the outer or upper end of the valve-shell.

The valve-shell A is provided with a fluid-cushion chamber D, formed in part in each of the sections $A'$ $A^2$ of the shell, the screw-threaded joint $a$ at the meeting ends of these sections or fittings preferably being about midway in the length of said fluid-cushion chamber D. The section or fitting $A^2$ of the valve-shell is provided with a delivery-chamber E, valve-chamber F, outlet-channel G, drainage-chamber H, and drainage-channels $H'$ and $H^2$, connecting the drainage-chamber H with the delivery-chamber E, and it is also provided with a valve-rod channel J.

K represents the valve rod or stem; $K'$, the cap which screws onto the valve rod or stem K and by means of which the valve and valve-rod K are depressed or operated. This cap is preferably soldered fast to K after being screwed on.

L represents the valve.

M is the outer cylinder of the fluid-cushion; N, the inner cylinder, member, or piston of the fluid-cushion. The cylinder M has removable bottom $M'$, screw-threaded thereto.

O represents a cross-pin threaded to screw through the head of the inner cylinder N and by means of which inner cylinder N is always held in a stationary position.

$O'$ is the threaded hole through the extended end of the inner cylinder N, through which cross-pin O is screwed and held; otherwise it would be very apt to be mislaid and lost when the basin-cock was taken apart for cleaning or repairs.

$O^2$ $O^2$ are notches cut in the upper rim of the lower fitting $A'$ to receive the ends of the cross-pin O.

P P represent longitudinal slots cut in the outer walls of the outer cylinder M, both being of the same size and situated exactly opposite each other. Through these slots cross-pin O, holding the inner cylinder N, passes, and the shape of the slots P P allows the outer cylinder M to move to and fro around the inner cylinder N.

Q represents a nut-lock to hold the valve in place.

R represents the extended circular end to the outer cylinder M, its upper part being threaded to receive the lock-nut Q and having a threaded recess $R'$ to receive the threaded end of the valve-rod K. The lock-nut Q is provided with a circular channel $J^2$, through which the valve-rod K passes and screws into the recess $R'$.

The threaded top, plug, or section $A^3$ of the valve-shell, which screws into the main section $A^2$, closes the drainage-chamber H at the upper end of the fitting $A^2$, this plug being provided with a central circular channel $J^3$, corresponding with the valve-rod channel J in the fitting $A^2$ and preferably having an extended octagonal end, as shown in the drawings, Fig. 7, to take the wrench, so that it can be tightly screwed into place.

T represents the longitudinal groove sunk in the wall of the valve-shell; $T'$, the set-screw passing through one side of the extended end of the cap K and adapted to move longitudinally only in the channel or groove T.

U represents the extended or raised inner center of the cap $K'$, having a threaded hole into which the threaded end of the valve-rod K screws.

V represents the loose rubber ring or bumper, adapted to allow the valve-rod K to pass through the center, resting on plug $A^3$ and against which the extension U of cap K strikes when the valve is operated.

I have especially designed my basin-cock for economical construction, simplicity in assembling or putting together or taking apart, and for solidity and durability.

The main fitting $A^2$ can be cast of metal, preferably brass, with delivery-chamber E, cushion-chamber D, and drainage-chamber H, so that the only machine-work necessary except threading and polishing will be to bore central vertical, preferably circular, valve-channel J, and horizontal, preferably circular, outlet-channels G and $H^2$, leading into the delivery-channel E and vertical circular drainage-channel $H'$ at the bottom of the drainage-chamber H and connecting with the channel $H^2$ and vertical valve-chamber F. I find by experiment that outlet G should not be larger in diameter than one-third the diameter of the delivery-spout C; otherwise the volume of water released will be greater than the spout C can deliver noiselessly. The fitting $A^2$ is made to tightly screw onto the fitting $A'$, and the shape of the lower part is preferably octagonal, as shown at $a^5$ in the drawings, Fig. 3, so that a wrench can be used to screw it firmly onto the fitting $A'$. The telescoping parts or cylinders of the fluid-cushion are preferably made of seamless brass tubing, the inside cylinder N closely telescoping within the outside cylinder M and only leaving a narrow or confined space for water or fluid under pressure to pass between and for convenience for taking apart and assembling and putting together. The outside cylinder M is provided with a removable bottom M', having a milled edge and which screws into the outside cylinder M.

In assembling the different parts of my basin-cock the inside cylinder N of the cushion is inserted into the outside cylinder M, the part M' being then screwed into place in the bottom of the cylinder M. The valve L is provided with a central circular opening made to fit the extended end R of the cylinder M and is preferably made of hard rubber or one of the materials known to the trade and especially designed to stand the action of hot water. This valve is next pushed around the extension R and fastened into place by the lock-nut Q. This lock-nut is provided with a milled edge and centrally pierced at $J^2$ to allow the lower end of the valve-rod K to screw into the recess R', which is threaded to receive it. The cross-pin O is next passed through one of the slots P in the cylinder M and screwed through the hole O' in the upper end of the inner cylinder N. This pin O is made so that when it is screwed in as far as the threads will allow it will project through the opposite slot in the cylinder M from the one through which it is first inserted and project equally from the opposite side of the cylinder M. The upper rim of the fitting A' is provided with two recesses $O^2$ $O^2$ opposite each other. The cushion is next suspended in the lower fitting A' by placing the projecting ends of the cross-pin O in the two recesses $O^2$. The central fitting $A^2$ is next firmly screwed on top of the fitting A'. The lower edge of the fitting $A^2$ will rest on the ends of the cross-pin O and hold the same firmly in place, and thereby the inner cylinder N of the cushion will always be stationary. The threaded top or plug $A^3$ is next screwed into the fitting $A^2$. The valve-rod K after putting the end opposite to the cap through the rubber ring V is next inserted through the opening $J^3$ in the plug $A^3$ and pushed down through the channel J and screwed into the threaded hole R' in the end of the raised end R of the cushion M through the central opening $J^2$ in the lock-nut Q. The channel T in the upper fitting $A^2$ is located so that when the valve-rod K is screwed as far as the threads will allow the set-screw T' in the cap K' will be opposite the channel T. The set-screw T' is next turned down until the end rests within the groove or channel T. The delivery-spout C is next screwed into the fitting $A^2$, and the basin-cock will then be complete. The operation of taking apart will be the reverse of that just described. The groove T and the set-screw T' in the cap K' are provided, so that the natural tendency of the operator when first handling the basin-cock to turn to the right or left instead of pressing or pushing the valve-rod cap K' will not unscrew the valve-rod K from the cushion, as the set-screw will not permit any lateral movement to either the cap K' or the valve-rod K, as it rests in the groove T, allowing only longitudinal motion. All overflow from the valve-chamber F along the valve-rod K and through the valve-rod channel J when the valve is open will be collected in the drainage-chamber H and delivered to the delivery-chamber E through the drainage-outlet $H^2$, as the extremity of this drainage-outlet is so situated that the water rushing under pressure out of the escape-outlet G will create enough suction at the extremity of the drainage-outlet $H^2$ (which is purposely located close to the escape-outlet G) to draw all overflow into the delivery-chamber E and the delivery-spout C.

The operation is as follows: The valve remains closed at all times when the water confined in the supply-pipe to which the basin-cock is attached is subjected to pressure; but as the area of inlet in the valve-chamber F around the valve-rod K and lock-nut Q is only about one-third the area of the delivery-chamber E and corresponds with the area of the escape-outlet G the initial pressure to be overcome (even if the water confined be under the extremely high pressure of one hundred and twenty-five pounds to the square inch) will not be excessive, and a very light pressure on the cap K' will move the valve L away from its seat and water will commence to flow. If it were not for the cushion, however, this slight pressure would fully depress the valve-rod K and valve L, and a full volume of water would gush out and splash over the basin; but as the valve and its connections are attached to the balance-cushion and as this cushion is submerged in the confined water the space between the inner and the outer cylinders is full of water, and as the valve is depressed the outer cylinder M moves down around the inner cylinder N, thereby enlarging the space between the two cylinders. This would tend to form a vacuum; but the space being full of water, as the space is enlarged more water is sucked in between the closely reciprocating or telescoping walls of the inner and outer cylinders, and this action is not immediate, the result being to check the quick downward movement of the valve and its connections, the effect to the operator being that of depressing the cap K' against an easy-working spring, it being impossible to push the cap K' down quick. The result is that the valve L is gradually opened until the full volume of water is released, and the inlet-openings being smaller than the delivery-spout when the valve is fully opened the discharging stream will be noiseless and steady. As the valve is fully depressed the part U of the cap K' will strike against the rubber bumper V, and the metallic noise which otherwise would occur will be avoided. When the operator removes his hand and pressure from cap K', the valve and its connections will gradually and quietly return to the seat and the water cease to flow. As the water will entirely fill the enlarged space between the inner and outer cylinders of the balance-cushion and as soon as the hand is removed from the cap K' the pressure of water against the cushion and attached valve would violently close the same if there were no way of checking and closing the valve and water-ram chattering and vibration would ensue; but as the valve starts back under pressure, the inner cylinder of the cushion being stationary, the outer cylinder only moves as the valve and valve-rod are attached to it, and the result is that the water confined between the inner and outer cylinders must be squeezed or forced out between their closely-telescoping walls before the valve can finally seat itself and water cease to flow. This action can be made to suit different cases by changing the length and diameter of the balance-cushion.

For private residences, for barber shops for shampooing, and other places it is often that a self-closing basin-cock only will not be convenient, but one which can be either self-closing or not at the will of the operator would be preferable. My basin-cock can readily be so adjusted as to supply this want. In Fig. 14 the groove T is shown supplied with two lateral notches W W', and in Fig. 15 the cylinder M is supplied with corresponding notches X X' in the slot P. In the cylinder these notches are cut in both the longitudinal slots P P. When the valve is depressed and a slight turn either way given to the cap K', the set-screw T' and cross-pin O will catch in the notches W or W' and the notches X or X' and the basin-cock will continue to discharge its contents when the operator removes his hand from the cap K'; but when a slight turn in the opposite direction is given to the cap K' the set-screw T' and cross-pin O will become detached from the notches and the valve will close.

It is evident that my basin-cock when arranged vertically, as in Fig. 1, can be tied or fastened open. There is, however, a great need for a self-closing basin-cock which cannot be tied or fastened open, as in large cities in hot weather the self-closing basin-cocks now in use are often fastened open to allow the water to run long enough to get cold and in cold weather are often fastened open to allow the water to run all night, so as not to freeze. This causes an extravagant waste of water, expensive to owners of buildings and dangerous to communities, as many cities have difficulty in supplying water on account of this unnecessary waste. I claim that my basin-cock when arranged horizontally cannot be tied or fastened open, as it would be necessary to put a brace from the cap to the opposite wall, and I illustrate in Fig. 16 a horizontal basin-cock. I further claim that this style of basin-cock will make it possible to greatly advance the art in ornamental designing of private and public bath-rooms, as one projecting basin-cock will be sufficient for drawing a glass of water, for cleaning teeth, &c.; but water for the basins can be delivered through low-down outlets, as shown in Fig. 16, or the outlets can be entirely concealed under the edge of the basins.

In the fluid-cushion a cylindrical shape has been chosen as best; but these telescoping parts may be constructed of another shape which would be attended with equivalent results, and I use the term "cylinder" as applied to the fluid-cushion independent of whether it is of circular or other form in cross-section. It is plain that the fluid-cushion here described might be with advantage put in combination with many forms of existing valves, both self-closing and non-automatic valves, as the ram and noise often occasioned by the use of such valves could be thereby avoided. Where such valves close against the direction of the discharging fluid, the only radical change in construction would be to reverse the direction of movement and parts of said fluid-cushion. A claim is therefore made of the essential parts of said fluid-cushion in combination with valves generally.

The construction, arrangement, and relative size of the several chambers D E F and outlet-channel G in the valve-shell coöperate with the fluid-cushion and aid materially in preventing water-hammering. The outlet-channel G, as is clearly illustrated in the drawings, is materially less in size or cross-sectional area than either the valve-chamber F or the delivery-chamber E, its size or area in cross-section being preferably about one-fifth that of the delivery-chamber E and about one-third that of the valve-chamber F, and the cushion-chamber D is preferably about three times the diameter of the valve-chamber, and I find by my experiments that by this construction of a small outlet-channel G, connecting at one end with a comparatively large delivery-chamber E and at its other end connecting at right angles with a valve-chamber F, large in respect to said outlet-channel, the tendency to water-hammering is very materially prevented, and when this construction is combined with my fluid-cushion all water-hammering is absolutely prevented even under the most unfavorable conditions and sudden variations of pressure.

In cases of cities or situations where the water-pressure is extremely low or liable at times to become very low it is advisable to supplement the water-pressure in closing the valve by other force, as that of a weight or spring, and in Fig. 1 I have therefore illustrated my invention with a supplemental means Z for aiding the water-pressure in closing the valve, the same consisting, preferably, of a spring acting against the movable member of the fluid-cushion. If it should be desired to use a weight as an equivalent of the spring, the weight of the movable member of the fluid-cushion itself may be so utilized by simply reversing the fluid-cushion, so that its weight tends to press the valve against the valve-seat instead of away from it. The spring Z is, however, entirely unnecessary where the water-pressure is, as ordinarily, from forty to one hundred pounds per square inch.

Various modifications may be made in the form of construction of different parts of my invention without departing from its principle and mode of operation.

As in my invention the valve as a whole is composed of two parts, and as the chamber and channels in the same are all straight and circular in form, they can be rapidly and cheaply bored with automatic machines and the whole very cheaply manufactured and put together.

By locating the extremity of the drainage-channel immediately alongside of the contracted outlet-channel and causing the two to terminate together at the delivery-chamber, where the fluid escaping under pressure expands, all overflow or leakage around the valve-rod is effectually overcome. If, however, the drainage-channel were simply connected with the valve-rod channel without the enlarged drainage-chamber, the leakage would not be entirely prevented; but by providing the drainage-chamber the fluid which escapes around the valve-rod expands and spreads out in the drainage-chamber and is readily and completely drawn or sucked out by the strong current or flow of fluid through the contracted outlet-channel into the enlarged delivery-chamber. My experiments show clearly that this stoppage of leakage or overflow cannot be entirely accomplished if the drainage-channel extends to the end of the delivery-spout or to any other place than exactly along the outlet-channel, as shown.

I claim—

1. The combination with a valve-shell of a valve closing with and opening against the fluid-pressure, and a fluid-cushion cylinder and piston within the valve-shell immersed in and its interior communicating with the fluid under pressure, one part of the cushion being connected to the shell and the other part thereof to the valve, the cylinder of said fluid-cushion being closed at both ends and having its communication with the valve-chamber at its middle portion, substantially as specified.

2. The combination with a valve-shell of a valve closing with and opening against the fluid-pressure, a fluid-cushion cylinder and piston within the valve-shell immersed in and its interior communicating with the fluid under pressure as its interior space expands or contracts in operation, one part of the cushion being connected to the shell and the other part thereof to the valve and movable therewith, said fluid-cushion cylinder being closed at both ends and having ingress and egress opening for the fluid at its middle portion, said fluid-cushion retarding and steadying the movement of the valve in both directions, substantially as specified.

3. The combination with a valve-shell of a valve closing with and opening against the fluid-pressure, and a fluid-cushion cylinder and piston within the valve-shell immersed in and its interior communicating with the fluid under pressure, one part of the cushion being connected to the shell and the other part thereof to the valve, said fluid-cushion cylinder being closed at both ends and having slots in its middle portion for the fluid to pass in and out, substantially as specified.

4. The combination with a valve-shell of a valve closing with and opening against the fluid-pressure, of a double-acting fluid-cushion piston and cylinder immersed in and its interior communicating with the fluid under pressure within the valve-shell, and connections for operating said fluid-cushion by movement of the valve in either direction, the cylinder of said fluid-cushion being closed at both ends, substantially as specified.

5. The combination with a valve of a valve-shell having two screw-threaded parts or sections, a transverse pin fitting between said sections, and a two-part fluid-cushion, one part connected to the valve-shell by said transverse pin and the other part connected to the valve, substantially as specified.

6. The combination with a valve of a valve-shell having two screw-threaded sections, a transverse pin fitting between said sections, a fluid-cushion piston secured to said pin, and a fluid-cushion cylinder connected to the valve and having slots to receive said pin, substantially as specified.

7. The combination with a valve of a valve-shell having two screw-threaded sections, a transverse pin fitting between said sections, a fluid-cushion piston secured to said pin, and a fluid-cushion cylinder connected to said valve and having slots to receive said pin, said pin having a screw-threaded connection with said fluid-cushion piston, substantially as specified.

8. The combination with a valve-shell and valve, of a fluid-cushion immersed in and its interior communicating with the fluid under pressure within said shell, and composed of two telescopic parts one connected to the valve-shell and the other to the valve, and operating to cushion and steady the movement of the valve, the outer or cylinder part of said fluid-cushion being closed at both ends, substantially as specified.

9. The combination with a valve-shell and valve, of a fluid-cushion immersed in and its interior communicating with the fluid under pressure within said shell, and composed of two telescopic parts one connected to the valve-shell and the other to the valve, and operating to cushion and steady the movement of the valve, the outer telescopic part or cylinder of said fluid-cushion being closed at both ends and having openings at its middle portion for ingress and egress of the fluid, said valve-shell having a drainage-chamber and a drainage-channel leading therefrom to the delivery chamber or orifice of the shell, said valve-shell having a contracted outlet-channel leading from said valve-chamber to said delivery-chamber and coöperating with said drainage-channel to draw or suck the liquid out of the drainage-chamber, substantially as specified.

10. The combination with a valve-shell and valve, of a fluid-cushion immersed in and its interior communicating with the fluid under pressure within said shell, and composed of two telescopic parts one connected to the valve-shell and the other to the valve, and operating to cushion and steady the movement of the valve, the outer telescopic part or cylinder of said fluid-cushion being closed at both ends and having openings at its middle portion for ingress and egress of the fluid, said valve-shell having a cushion-chamber, a valve-chamber, a delivery chamber or orifice, a contracted outlet-channel leading from said valve-chamber to said delivery-chamber, a drainage-chamber, and a drainage-channel terminating in said delivery-chamber adjacent to said outlet-channel, and having a portion parallel to said outlet-channel, the fluid flow and pressure in the contracted outlet-channel operating to draw or suck the liquid out of the drainage chamber and channel, substantially as specified.

11. The combination with a valve-shell and valve, of a fluid-cushion immersed in and its interior communicating with the fluid under pressure within said shell, and composed of two telescopic parts one connected to the valve-shell and the other to the valve, and operating to cushion and steady the movement of the valve, the outer telescopic part or cylinder of said cushion being closed at both ends and having openings at its middle portion for ingress and egress of the fluid, substantially as specified.

12. The combination with a valve-shell of a valve and valve-stem, a fluid-cushion piston and cylinder, the latter having a shouldered screw-threaded end upon which the valve is mounted and to which the valve-stem is secured, substantially as specified.

13. The combination with a valve-shell of a valve and valve-stem, a fluid-cushion piston and cylinder, the latter having a shouldered screw-threaded end upon which the valve is mounted and to which the valve-stem is secured, and said cushion-cylinder having a removable plug closing its opposite end, substantially as specified.

14. The combination with a valve and valve-stem, of a valve-shell having two sections or fittings screw-threaded together, a transverse pin fitting between the meeting ends of said sections, a fluid-cushion piston and cylinder, one secured to said transverse pin and the other slotted to reciprocate in respect thereto, substantially as specified.

15. The combination with a valve and valve-stem of a valve-shell, having two screw-threaded sections, a transverse pin between the meeting ends of said sections, a fluid-cushion piston secured thereto, a reciprocating fluid-cushion cylinder having longitudinal slots to receive said pin, and a cap on the upper end of said valve-stem, said cap and valve-shell having a longitudinal groove and pin to prevent rotation, substantially as specified.

16. The combination with a valve and valve-stem of a valve-shell, having two screw-threaded sections, a transverse pin between the meeting ends of said sections, a fluid-cushion piston secured thereto, a reciprocating fluid-cushion cylinder having longitudinal slots to receive said pin, a shouldered end to receive said valve, and screw-threads to receive the valve-stem, substantially as specified.

17. The combination with a valve and valve-stem of a valve-shell, having two screw-threaded sections, a transverse pin between the meeting ends of said sections, a fluid-cushion piston secured thereto, a reciprocating fluid-cushion cylinder having longitudinal slots to receive said pin, a shouldered end to receive said valve, screw-threads to receive the valve-stem, and a nut Q to hold the valve in place, substantially as specified.

18. The combination with a valve and valve-stem of a valve-shell, having two screw-threaded sections, a transverse pin between the meeting ends of said sections, a fluid-cushion piston secured thereto, a reciprocating fluid-cushion cylinder having longitudinal slots to receive said pin, a shouldered end to receive said valve, and a removable screw-plug at its opposite end, substantially as specified.

19. The combination with a valve and valve-stem of a valve-shell, having two screw-threaded sections, a transverse pin between the meeting ends of said sections, a fluid-cushion piston secured thereto, a reciprocating fluid-cushion cylinder having longitudinal slots to receive said pin and a cap on the upper end of said valve-stem, said cap and valve-shell having a longitudinal groove and pin to prevent rotation, said longitudinal slots in the cushion-cylinder and in the valve-stem cap having transverse slots to adapt the valve to be held open, substantially as specified.

20. The combination with a valve and valve-stem, of a valve-shell having two sections or fittings screw-threaded together, a transverse pin fitting between the meeting ends of said sections, a fluid-cushion piston and cylinder, one secured to said transverse pin and the other slotted to reciprocate in respect thereto, one of said screw-threaded sections of the valve-shell having notches or recesses in its end to receive said transverse pin, substantially as specified.

21. The combination with a bowl or vessel of a valve-shell, a valve therein closing with and opening against the fluid-pressure, a horizontally-extending valve-stem having a cap or knob on its outer end, and an upright wall or slab through which the valve-stem projects and behind which the valve-shell and its supply-pipe and discharge-tube connections fit, whereby the valve is rendered less capable of being tied open, substantially as specified.

22. The combination with a bowl or vessel, a valve therein closing with and opening against the fluid-pressure, a fluid-cushion composed of two telescopic parts, one connected to the valve-shell and the other to the valve, a horizontally-extending valve-stem having a cap or knob on its outer end, and an upright wall or slab through which the valve-stem projects and behind which the valve-shell and its connections fit, whereby the valve is rendered less capable of being tied open, substantially as specified.

23. The combination with a valve of a valve-shell having two screw-threaded parts or sections, a transverse pin fitting between said sections, and a two-part fluid-cushion, one part connected to the valve-shell by said transverse pin and the other part connected to the valve, said valve-shell having a valve-seat and valve-chamber, a drainage-chamber, a delivery or discharge chamber, an escape-outlet connecting the valve-chamber and delivery-chamber, and a drainage-outlet connecting the drainage-chamber and delivery-chamber, substantially as specified.

24. The combination with a valve-shell, of a valve and a fluid-cushion immersed in the fluid under pressure in the valve-shell and composed of two telescopic parts, one connected to the valve-shell and the other to the valve, the outer or cylinder part of said fluid-cushion being closed at both ends and having an ingress and egress opening for the fluid at its middle portion, substantially as specified.

25. The combination with a valve-shell of a valve closing with and opening against the fluid-pressure, a fluid-cushion cylinder and piston within the valve-shell immersed in and its interior communicating with the fluid under pressure, one part of the cushion being connected to the shell and the other part thereof to the valve, the outer or cylinder part of said fluid-cushion being closed at both ends and having an ingress and egress opening for the fluid at its middle portion and a supplemental means to aid the water-pressure inclosing the valve, substantially as specified.

26. The combination with a valve-shell of a valve closing with and opening against the fluid-pressure, a fluid-cushion cylinder and piston within the valve-shell immersed in and its interior communicating with the fluid under pressure, one part of the cushion being connected to the shell and the other part thereof to the valve, the outer or cylinder part of said fluid-cushion being closed at both ends and having an ingress and egress opening for the fluid at its middle portion and a spring to supplement or aid the water-pressure in closing the valve when the water-pressure is low or wanting, substantially as specified.

27. The combination with a valve-shell of a valve closing with and opening against the fluid-pressure, and a fluid-cushion cylinder and piston within the valve-shell immersed in and its interior communicating with the fluid under pressure, one part of the cushion being connected to the shell and the other part thereof to the valve, the outer telescopic part or cylinder of said fluid-cushion being closed at both ends and having openings at its middle portion for ingress and egress of the fluid, said valve-shell having a cushion-chamber D, delivery-chamber E, valve-chamber F and a comparatively small outlet-channel G connecting said chambers E and F, a drainage-chamber and drainage-channel leading into said delivery-chamber at the end of said contracted outlet-channel G to cause the flow of the liquid under pressure to draw out or suck the liquid from the drainage chamber and channel, substantially as specified.

28. The combination with a valve-shell of a valve closing with and opening against the fluid-pressure, and a fluid-cushion cylinder and piston within the valve-shell immersed in and its interior communicating with the fluid under pressure, one part of the cushion being connected to the shell and the other part thereof to the valve, the outer telescopic part or cylinder of said fluid-cushion being closed at both ends and having openings at its middle portion for ingress and egress of the fluid, said valve-shell having a delivery-chamber E, valve-chamber F and a comparatively small outlet-channel G connecting said chambers E and F, a drainage-chamber and drainage-channel leading into said delivery-chamber at the end of said contracted outlet-channel G to cause the flow of the liquid under pressure to draw out or suck the liquid from the drainage chamber and channel, substantially as specified.

29. The combination with a valve-shell of a valve closing with and opening against the fluid-pressure, and a fluid-cushion cylinder and piston within the valve-shell immersed in and its interior communicating with the fluid under pressure, one part of the cushion being connected to the shell and the other part thereof to the valve, the outer telescopic part or cylinder of said fluid-cushion being closed at both ends and having openings at its middle portion for ingress and egress of the fluid, said valve-shell having a cushion-chamber D, delivery-chamber E, valve-chamber F, and a comparatively small outlet-channel G connecting said chambers E and F, drainage-chamber H and drainage-channels H', H², said channel H² extending parallel to said channel G, substantially as specified.

FREDERIC HAMILTON MASON.

Witnesses:
HERBERT SMITH,
H. O. ADAMS.